US010000917B2

(12) United States Patent
Katona

(10) Patent No.: US 10,000,917 B2
(45) Date of Patent: Jun. 19, 2018

(54) SYSTEMS, DEVICES, AND/OR METHODS FOR MANAGING TOILET FRAGRANCES

(71) Applicant: Thomas J. Katona, Sutter Ridge, CA (US)

(72) Inventor: Thomas J. Katona, Sutter Ridge, CA (US)

(*) Notice: Subject to any disclaimer, the term of this patent is extended or adjusted under 35 U.S.C. 154(b) by 0 days. days.

(21) Appl. No.: 15/447,958

(22) Filed: Mar. 2, 2017

(65) Prior Publication Data
US 2017/0292258 A1 Oct. 12, 2017

Related U.S. Application Data

(60) Provisional application No. 62/319,996, filed on Apr. 8, 2016.

(51) Int. Cl.
*E03D 9/04* (2006.01)
*E03D 9/00* (2006.01)
*E03D 5/00* (2006.01)

(52) U.S. Cl.
CPC .............. *E03D 9/007* (2013.01); *E03D 5/00* (2013.01); *A47K 2201/00* (2013.01)

(58) Field of Classification Search
CPC .. E03D 9/007; E03D 5/00; E03D 9/05; E03D 9/052; A47K 2201/00
USPC ............ 4/347, 349, 351, 352, 214, 215, 209
See application file for complete search history.

(56) References Cited

U.S. PATENT DOCUMENTS

| 3,359,884 | A | * | 12/1967 | Statter | E03D 9/052 4/215 |
| 3,605,126 | A | * | 9/1971 | Henry | E03D 5/022 4/209 FF |
| 4,031,574 | A | * | 6/1977 | Werner | E03D 9/052 4/213 |
| 4,166,298 | A | * | 9/1979 | Pearson | E03D 9/052 4/213 |
| 5,079,783 | A | * | 1/1992 | Haletsky | A47K 13/307 4/217 |
| 5,689,837 | A | * | 11/1997 | Katona | A61L 9/122 4/214 |
| 5,829,066 | A | * | 11/1998 | Aibe | E03D 9/052 4/213 |
| 6,009,567 | A | * | 1/2000 | Dean | E03D 9/007 4/224 |
| 6,351,855 | B1 | * | 3/2002 | Allen | E03D 9/05 4/213 |
| 8,196,232 | B2 | * | 6/2012 | Van Herp | E03D 11/14 4/224 |
| 2014/0076983 | A1 | * | 3/2014 | Irwin | E03D 13/005 239/6 |

* cited by examiner

*Primary Examiner* — Benjamin R Shaw
(74) *Attorney, Agent, or Firm* — Dale Jensen, PLC; Dale Jensen

(57) ABSTRACT

Certain exemplary embodiments can provide a system, which comprises a turbine wheel assembly. The turbine wheel assembly comprises a turbine wheel compartment. The turbine wheel compartment is constructed to be coupled to a fan. The fan can be coupled to a cartridge. The turbine wheel compartment is coupleable to a toilet fill valve assembly such that the turbine wheel assembly is housed within a toilet tank. The turbine wheel assembly comprises a turbine wheel.

15 Claims, 8 Drawing Sheets

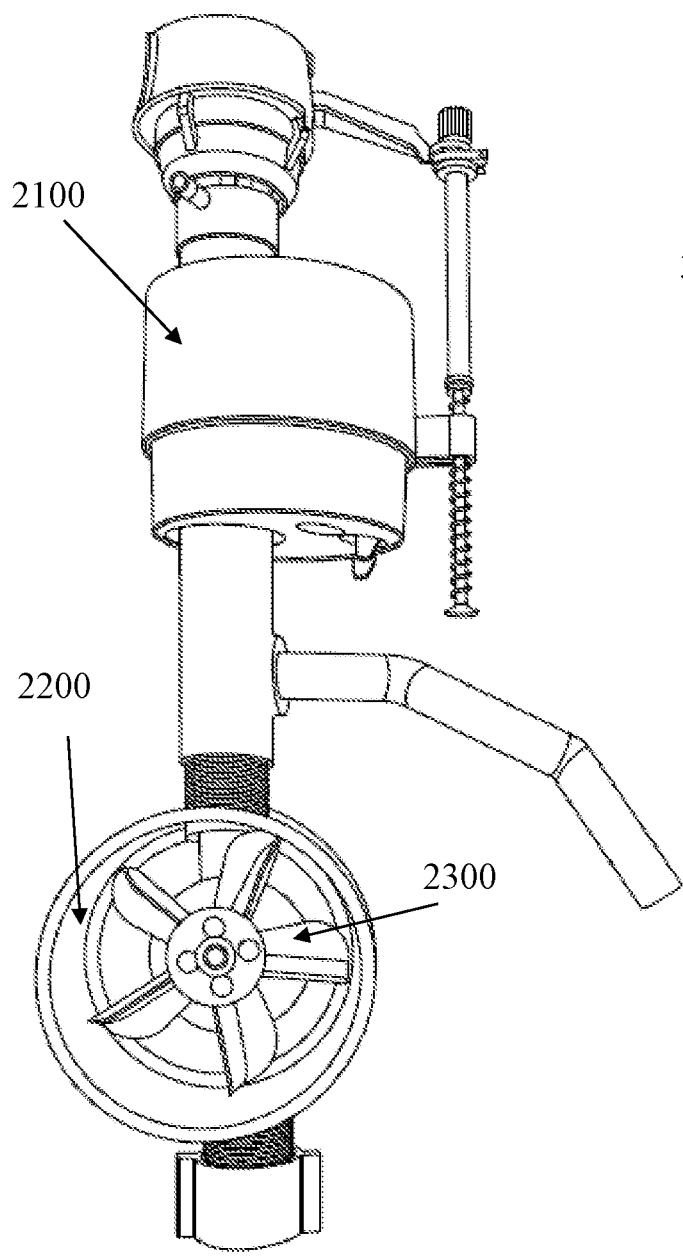
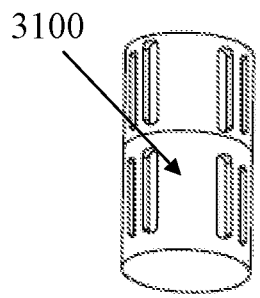
FIG. 2
FIG. 3

SYSTEMS, DEVICES, AND/OR METHODS FOR MANAGING TOILET FRAGRANCES

CROSS-REFERENCES TO RELATED APPLICATIONS

This application claims priority to, and incorporates by reference herein in its entirety, U.S. Provisional Patent Application Ser. No. 62/319,996, filed Apr. 8, 2016.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 2 is a perspective view of an exemplary embodiment of a system 2000;

FIG. 3 is a perspective view of an exemplary embodiment of a system 3000;

DETAILED DESCRIPTION

Figure 1:
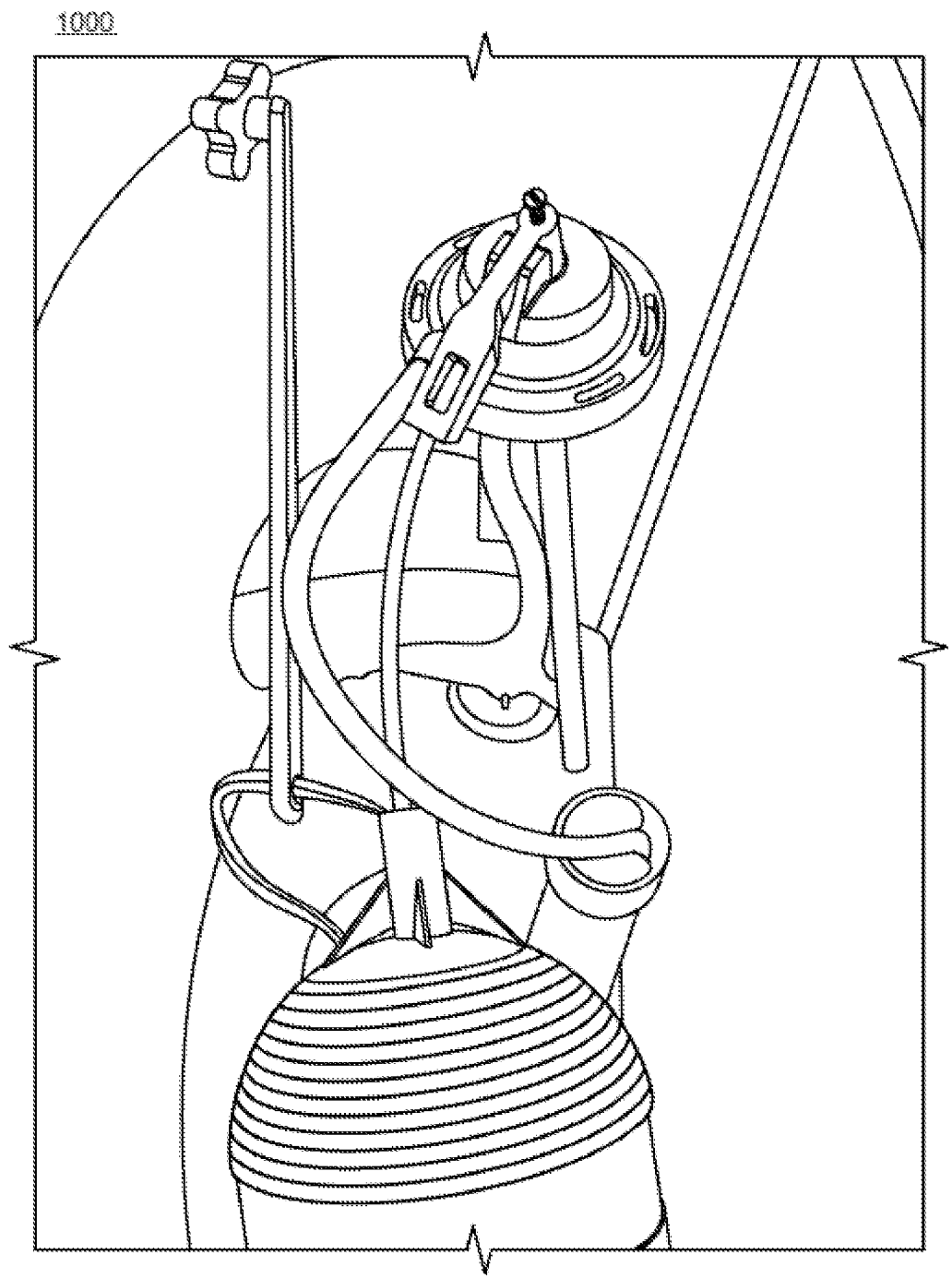
FIG. 1 is a perspective view of an exemplary embodiment of a system 1000.

Certain exemplary embodiments can provide a system, which comprises a turbine wheel assembly. The turbine wheel assembly comprises a turbine wheel compartment. The turbine wheel compartment is constructed to be coupled to a fan. The fan can be coupled to a cartridge. The turbine wheel compartment is coupleable to a toilet fill valve assembly such that the turbine wheel assembly is housed within a toilet tank. The turbine wheel assembly comprises a turbine wheel.

Certain exemplary embodiments are constructed to deodorize a bathroom or toilet room simply by flushing the toilet with a unit, which can be called a "Water Powered Turbine Fan", built into a toilet tank.

In certain exemplary embodiments, there are no batteries, electrical couplings, or counter space to operate this unit. The Water Powered Turbine Fan may be considered green or eco-friendly: there are no harmful substances released into the water or air that may be harmful to pets or that leave a residue in the toilet bowl. Deodorizing substances used are selected to be safe to breathe. Certain exemplary embodiments solve a problem older homes have with plumbing which turns warm water into scalding water in a shower when a toilet is flushed, the scalding water is now eliminated with this unit because water flows into the toilet tank at a relatively slow rate.

Certain exemplary embodiments comprise a replaceable cartridge to deodorize the bathroom upon flushing the toilet. Some cartridges may be replaced approximately every 30-60 days based on the type of materials, odor eliminators and scents used in the replacement cartridges. In certain exemplary embodiments, the scent and odor eliminators expand into master bedrooms and living spaces surrounding the guest bathrooms deodorizing more than just the bathroom.

The Water Powered Turbine Fan is a unit built on the supply line of the float in the toilet tank. This unit is made from plastic materials. There is a turbine wheel (e.g., a turbine wheel with a diameter of approximately 1.25 inches) with two magnets built into the turbine wheel. On the other side of the turbine wheel compartment, there is a fan (e.g., a fan having a diameter of approximately three inches) mounted on an axial with substantially identical magnets (e.g., substantially rectangular magnets measuring approximately 0.25 inches by 0.25 inches) built inside of the fan (e.g., two magnets, four total). The magnets repel to create a repelling magnetic spinning gear. Certain exemplary embodiments do not use seals. The protective shroud around the fan seals the water in the tank from the built-in unit. On the outer end of this shroud there is a mount for its replacement fragrance cartridges for simple and easy replacement.

When the toilet is flushed, water comes in through the water line up through the Water Powered Turbine Fan, which is coupled to the water supply line of a toilet fill float assembly. The water passes through the float and the tank fills up with water. The water pressure coming through the water line and also through the Water Powered Turbine Fan (built onto the float) spins the turbine wheel and engages the fan. The fan spin speeds range between approximately 500-800 rpm depending on the water pressure. The fan circulates air and blows through the shroud and fragrance cartridge, which dispenses fragrance and/or odor eliminator into the air, thereby deodorizing the bathroom and surrounding areas. The Water Powered Turbine Fan comes through a sealed hole in the toilet tank to incorporate this new built-in unit. The open outer end of the unit is exposed through the toilet tank where the cartridge is mounted.

Certain exemplary embodiments provide a toilet turbine wheel assembly capable of ventilating and neutralizing odors in the area surrounding a toilet after the toilet is flushed. Certain exemplary embodiments provide a water actuated toilet turbine wheel inserted in a toilet tank.

Certain exemplary embodiments ventilate and neutralize odors through activation of a water-driven fan/turbine wheel automatically after the toilet is flushed.

Certain exemplary embodiments provide an inexpensive system that connects easily to an existing toilet, and is powered by the water pressure in the plumbing line.

Certain exemplary embodiments act to deodorize an area surrounding a toilet in a low-cost, low-maintenance, and safe manner using a device that can easily be added to an existing toilet system.

Certain exemplary embodiments provide water-actuated, toilet fan and turbine wheel assembly comprising: a cartridge member with fragrance oil and a turbine wheel member.

Water flows through a turbine wheel compartment comprising a cartridge that holds fragrance oil. One side of the cartridge can comprise a door that retains fragrance oil, which fragrance oil is comprised by the cartridge. To insert or replace the cartridge, the user uncovers the toilet tank, removes the old cartridge, and places a new cartridge in the system.

The inner face of the cartridge can be perforated to allow water to contact the fragrance oil as the water passes through the cartridge. The fragrance oil slowly dissolves and can be replaced as desired.

The fragrance oil can be a deodorizing and cleaning oil installed within the tank to maintain the toilet clean and fresh smelling.

Water travels to the deodorizing member via motive force provided by the turbine wheel member. The turbine wheel compartment of the turbine wheel member and the deodorizing member can be substantially cylindrical.

The turbine wheel can be a rotor with perimeter vanes. The axis of the rotor is perpendicular to the direction of the water flow and a shaft located along the axis through the rotor can rotate about an axis.

Curved protruding vanes can be attached to the outer perimeter of the rotor and can be sized in a manner that the vanes do not touch the inner surface of the turbine wheel compartment such that the rotor can spin freely. Water enters the bottom of the turbine wheel then catches the curved protruding vanes and some of the water's linear motion is transferred to rotary motion about the axis of the rotor.

Once an exemplary system is installed, a user operates the toilet as before. The system is activated after the toilet is flushed. Once flushed, the valve connected to the flushing lever opens and allows water to fill the water tank. While the water tank is refilling, water travels through the turbine wheel compartment and into the water tank. The movement of water through the system during the water tank refill causes the turbine wheel and fan to spin and some of a deodorizing substance comprising the fragrance oil to dissolve and/or become entrained in the air around the toilet.

FIG. 1 is a perspective view of an exemplary embodiment of a system 1000, which comprises a toilet fill valve assembly installed in a toilet tank. The system comprises a turbine wheel compartment. The turbine wheel compartment comprises a cartridge constructed to retain fragrance oil. The turbine wheel compartment is also constructed to at least partially surround a turbine wheel. The turbine wheel, in conjunction with a fan, is constructed to cause water to run across the cartridge such that the deodorizing substance comprised by the fragrance oil is released into the toilet tank.

FIG. 2 is a perspective view of an exemplary embodiment of a system 2000, which comprises a toilet fill valve assembly 2100 shown outside of a toilet tank. The system comprises a shroud 2200. Shroud 2200 is coupleable to a cartridge (cartridge 3100 of FIG. 3) constructed to retain fragrance oil. Shroud 2200 is also constructed to at least partially surround a fan 2300. Fan 2300 is constructed to cause water to run across the cartridge such that a deodorizing substance comprised by the fragrance oil is released into the toilet tank.

FIG. 3 is a perspective view of an exemplary embodiment of a system 3000, which illustrates a cartridge 3100. Cartridge 3100 can be comprised by system 1000 of FIG. 1 and/or system 2000 of FIG. 2. In certain exemplary embodiments, cartridge 3100 can be openable to insert and/or replace fragrance oil in cartridge 3100. In other embodiments, cartridge 3100 is disposable and replaced with a new cartridge when the fragrance oil is spent.

Figure 4:
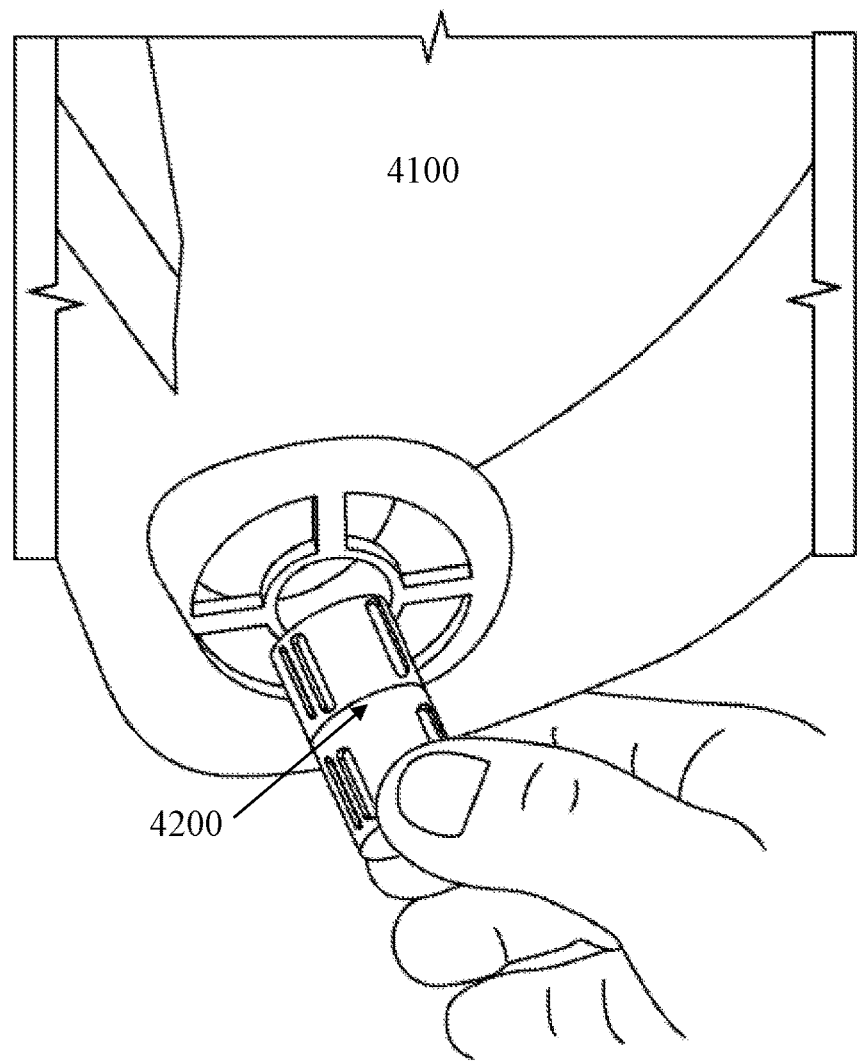
FIG. 4 is a perspective view of an exemplary embodiment of a system 4000.

FIG. 4 is a perspective view of an exemplary embodiment of a system 4000, which comprises a housing 4100. Housing 4100 is constructed to be releasably coupled to and retain a cartridge 4200 such as cartridge 3100 of FIG. 3.

Figure 5:
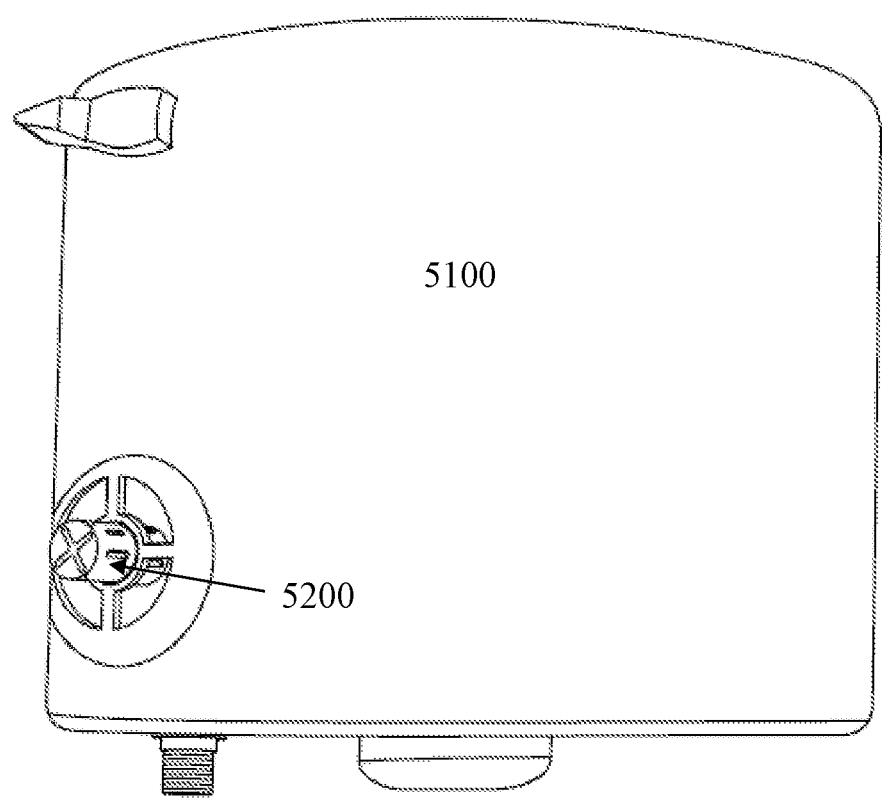
FIG. 5 is a perspective view of an exemplary embodiment of a system 5000.

FIG. 5 is a perspective view of an exemplary embodiment of a system 5000, which comprises a housing 5100. As shown, housing 5100 is coupled to a cartridge 5200 such as cartridge 3100 of FIG. 3.

Figure 6:
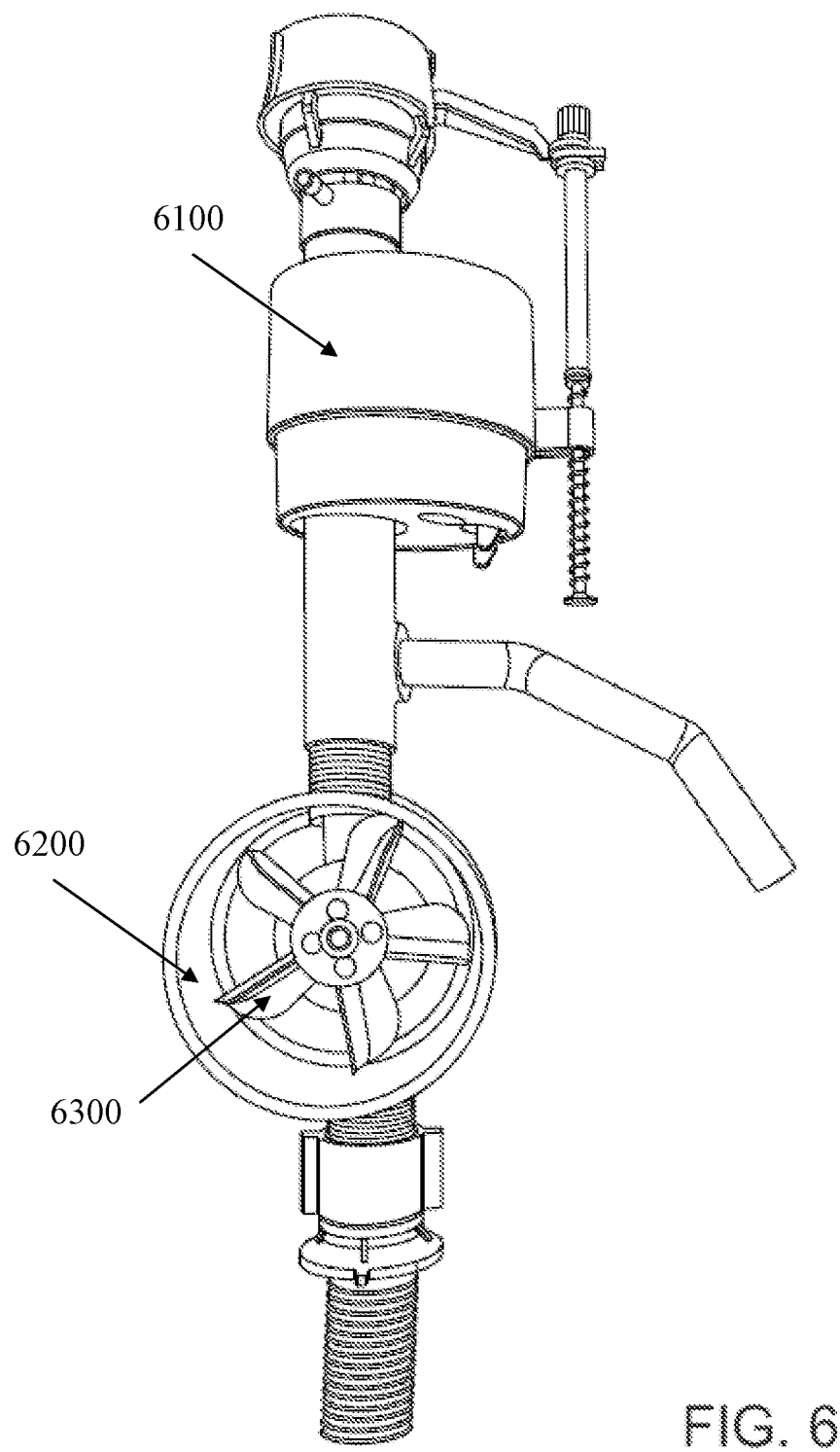
FIG. 6 is a perspective view of an exemplary embodiment of a system 6000.

FIG. 6 is a perspective view of an exemplary embodiment of a system 6000, which comprises a toilet fill valve assembly 6100 shown outside of a toilet tank. System 6000 comprises a shroud 6200. Shroud 6200 is coupleable to a cartridge constructed to retain fragrance oil. Shroud 6200 is also constructed to at least partially surround a fan 6300. Fan 6300 is constructed to cause water and/or air to flow across the fragrance oil such that a deodorizing substance comprised by the fragrance oil is released into the toilet tank.

Figure 7:
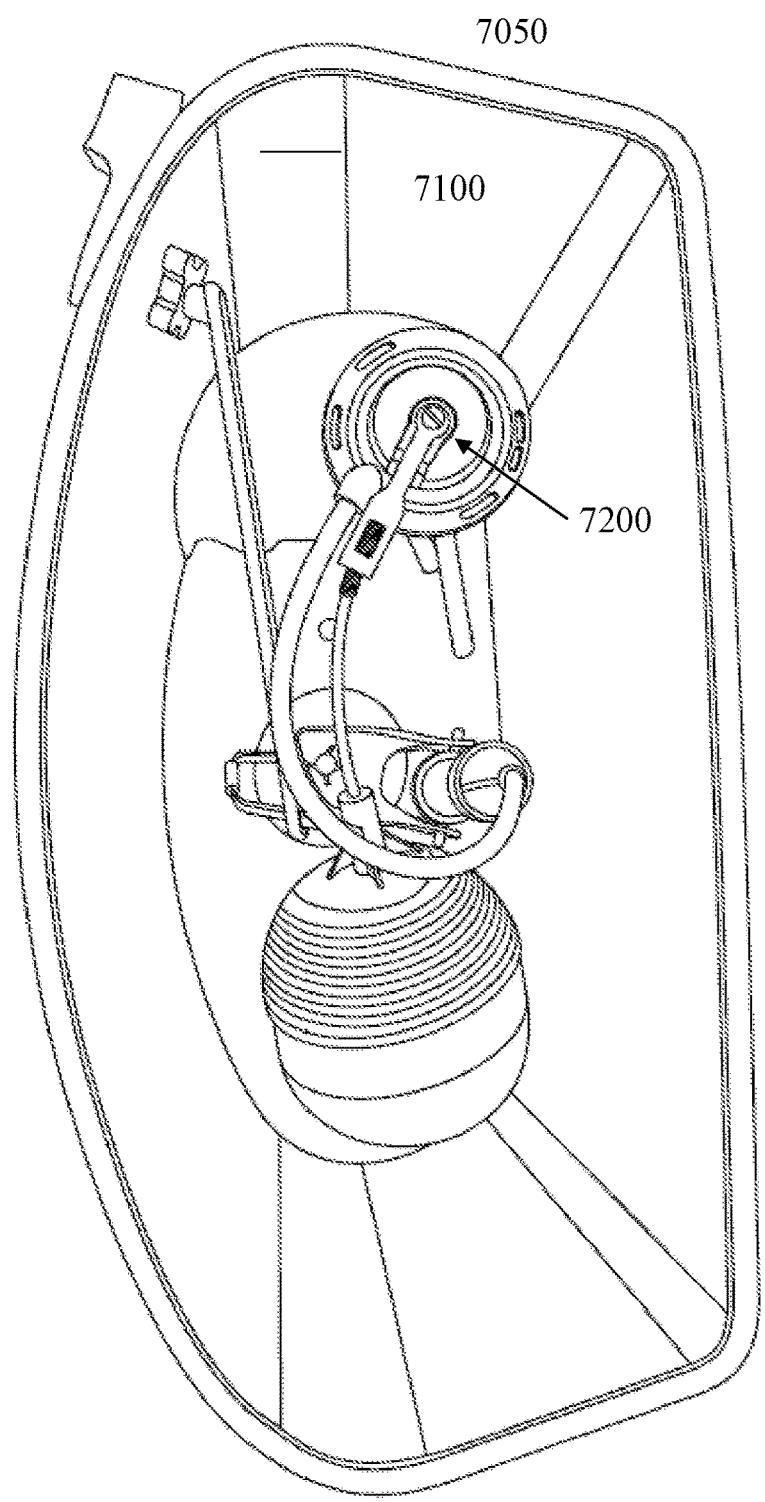
FIG. 7 is a perspective view of an exemplary embodiment of a system 7000.
Figure 8:
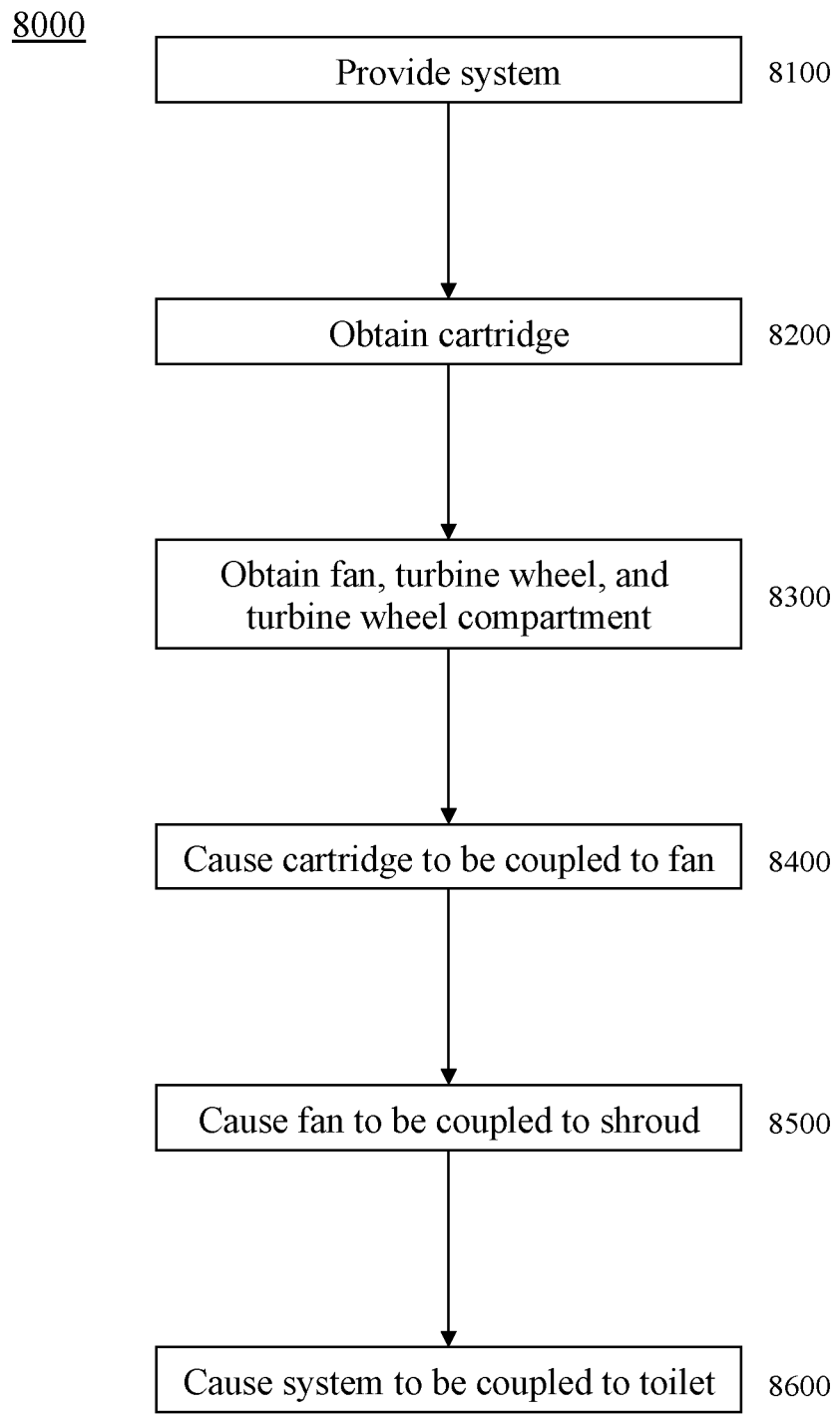
FIG. 8 is a flowchart of an exemplary embodiment of a method 8000.

FIG. 7 is a perspective view of an exemplary embodiment of a system 7000, which comprises a toilet fill valve assembly 7200 installed in a toilet tank 7100 of a toilet 7050. The system comprises a shroud. The shroud is coupleable to a cartridge constructed to retain fragrance oil. The shroud is also constructed to at least partially surround a fan. The fan is constructed to cause water and/or air to flow across the fragrance oil such that a deodorizing substance comprised by the fragrance oil is released into the toilet tank FIG. 8 is a flowchart of an exemplary embodiment of a method 8000, which can comprise providing a system. At activity 8100, a system can be provided, the system can comprise:
- a turbine wheel compartment;
- a turbine wheel assembly, the turbine wheel assembly housed in the turbine wheel compartment, the turbine wheel compartment is coupleable to a toilet fill valve assembly such that the turbine wheel assembly is housed within a toilet tank, the turbine wheel assembly comprises a turbine wheel, the turbine wheel is constructed to rotate as water fills the toilet tank;
- a magnet;
- a fan coupled to the turbine wheel via the magnet, the fan is coupleable to a cartridge, the cartridge can comprise fragrance oil or other substance, the fan is constructed to rotate with the turbine wheel and propel water or air across the cartridge such that the fragrance oil partially dissolves and is released into the toilet tank and air comprised by the toilet tank; and/or
- a shroud that substantially surrounds a periphery of the fan, wherein the shroud is constructed to be coupled to a cartridge (e.g., a fragrance oil cartridge).

At activity 8200, the cartridge can be obtained. The cartridge is constructed to retain fragrance oil. The fragrance oil is consumable and the cartridge and/or the fragrance oil can be replaced by a user as desired. At activity 8300, a fan, turbine wheel, and/or turbine wheel compartment can be obtained. Certain exemplary embodiments obtain a turbine wheel assembly, the turbine wheel assembly comprising a turbine wheel compartment. The turbine wheel compartment is constructed to hold fragrance oil. The turbine wheel compartment is coupleable to a toilet fill valve assembly such that the turbine wheel assembly is housed within a toilet tank. The turbine wheel assembly comprises a turbine wheel, which is constructed to rotate as water fills the toilet tank and propel water across the fragrance oil such that the fragrance oil partially dissolves and releases a chemical into the toilet tank.

At activity 8400, the cartridge can be caused to be coupled to the fan or the shroud. At activity 8500, the fan can be caused to be coupled to the shroud. At activity 8600, the system can be caused to be coupled to a toilet, such as via coupling the shroud to a fill valve system.

Figure 9:
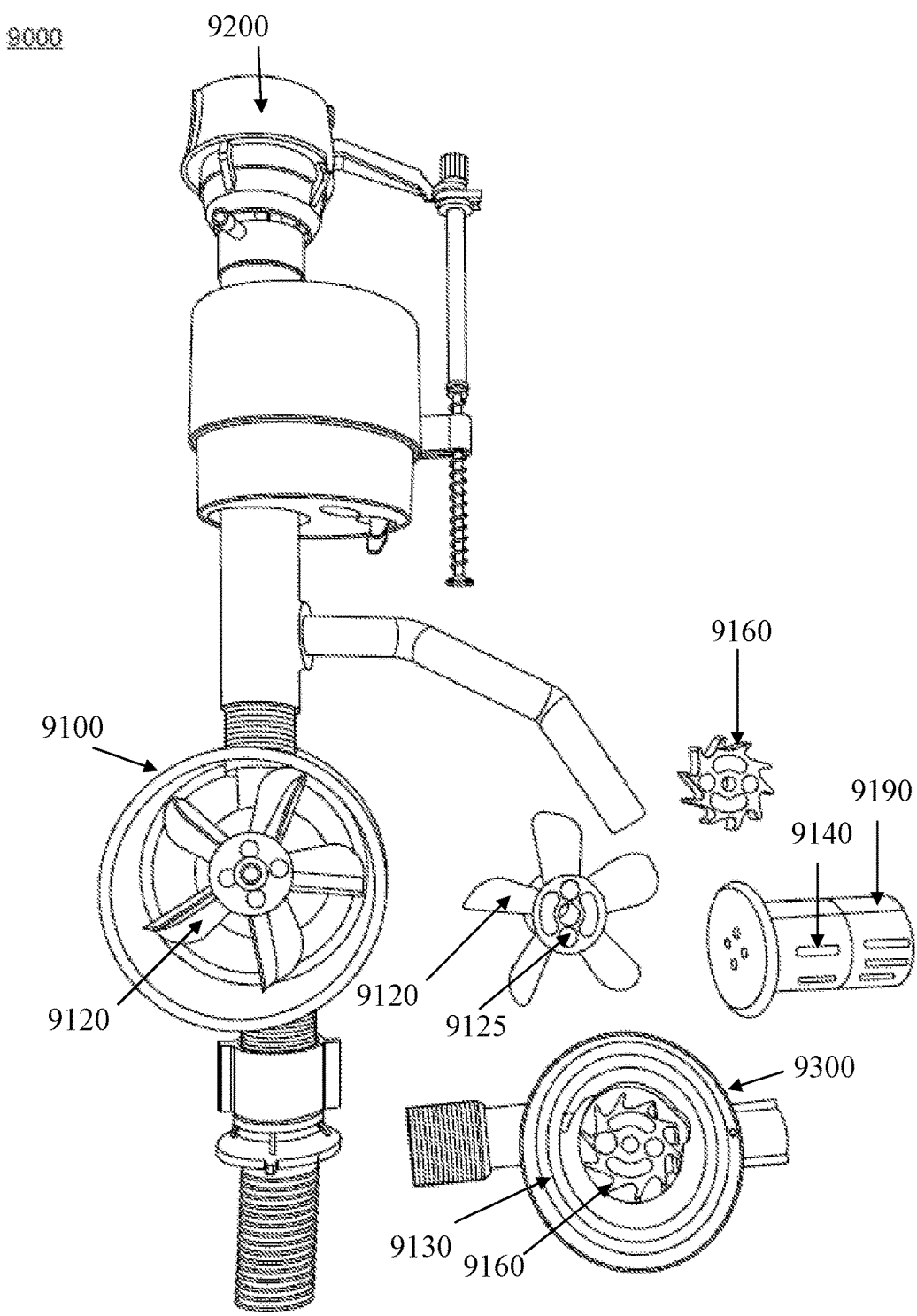
FIG. 9 is a perspective exploded parts view of an exemplary embodiment of a system 9000.

FIG. 9 is a perspective exploded parts view of an exemplary embodiment of a system 9000, which comprises a shroud 9100. Shroud 9100 substantially surrounds a periphery of fan 9120. Fan 9120 is constructed to be coupled to a cartridge 9190, which comprises fragrance oil 9140. Fan 9120 comprises one or more magnets 9125, which can couple fan 9120 to turbine wheel 9160 and/or can couple fan 9120 to cartridge 9190. Fragrance oil 9140 can comprises a deodorant, a cleaning agent, and/or a sanitizing agent. Shroud 9100 is coupleable to a toilet fill valve assembly 9200 such that shroud 9100 is housed within a toilet tank (e.g., toilet tank 7100 of FIG. 7).

System 9000 comprises a turbine wheel assembly 9300. Turbine wheel assembly 9300 comprises a turbine wheel compartment 9130 and a turbine wheel 9160, which is housed by turbine wheel compartment 9130. Turbine wheel assembly 9300 is coupleable to toilet fill valve assembly 9200 such that turbine wheel assembly 9300 is housed within a toilet tank. Turbine wheel 9160 is constructed to rotate as water fills the toilet tank and causes fan 9120 to rotate such that water flows across fragrance oil 9140 such that fragrance oil 9140 partially dissolves and releases a chemical into the toilet tank. Fan 9120 is coupled to turbine wheel 9160. Thus, fan 9120 rotates as turbine wheel 9160 rotates. Fan 9120 is constructed to propel water or air across cartridge 9190 such that fragrance oil 9140 partially dissolves and is released into the toilet tank and air comprised by the toilet tank. Fan 9120 blows vapors emitted from fragrance oil 9140 into the toilet tank when a water level in the tank is below a level of fan 9120 and causes water to circulate in the toilet tank when the water level in the tank is above the level of fan 9120.

Certain exemplary embodiments provide systems, devices, and/or methods capable of ventilating and neutralizing odors in the area surrounding a toilet after the toilet is flushed. Certain exemplary embodiments provide a water actuated toilet turbine wheel inserted between the water shut-off valve and the toilet intake connector that ventilates and neutralizes odors through activation of a water-driven fan automatically after the toilet is flushed.

The inner face of the cartridge is perforated and allows water traveling through the inner cylindrical pipe to contact the fragrance oil before the water exits from the deodorant turbine wheel compartment. The fragrance oil slowly dissolves and eventually requires replacement. The fragrance oil can comprise one or more of a deodorizing, sanitizing, and/or cleaning substance that maintains the toilet in a clean and fresh smelling state.

The fan comprises a rotor with vanes. The axis of the rotor is perpendicular to the direction of the water flow. Curved protruding vanes are attached to the outer perimeter of the rotor and are sized in a manner that the vanes do not touch the inner surface of the shroud and the rotor can spin freely. Water flows through across turbine wheel as the toilet tank fills. The water catches the curved protruding vanes and some of the water's linear motion is transferred to rotary motion about the axis of the rotor of the turbine wheel.

Once an exemplary embodiment is installed, the user operates the toilet as before. The fragrance oil is activated after the toilet is flushed. Once flushed, the valve connected to the flushing lever opens and allows water to fill the water tank. While the water tank is refilling, water travels across the turbine wheel and into the water tank. The movement of across the turbine wheel causes the fan to rotate and move air and/or water in the toilet tank.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

adapter—a device used to effect operative compatibility between different parts of one or more pieces of an apparatus or system.

and/or—either in conjunction with or in alternative to.

across—over a surface of something.

apparatus—an appliance or device for a particular purpose associate—to join, connect together, and/or relate.

blow—to send forth a current of air.

can—is capable of, in at least some embodiments.

chemical—a substance that either sanitizes, deodorizes, or cleans.

fragrance oil—a block of a substantially solid material that comprises a substance that substance that either sanitizes, deodorizes, or cleans.

cleaning agent—a substance used to remove dirt, stains, bad smells, and clutter from surfaces.

comprising—including but not limited to.

configure—to make suitable or fit for a specific use or situation.

connect—to join or fasten together.

constructed to—made to and/or designed to.

coupleable—capable of being joined, connected, and/or linked together.

coupling—linking in some fashion.

define—to establish the outline, form, or structure of.

deodorant—a substance that destroys or masks unpleasant odors.

deodorize—to cause an aroma to emanate.

device—a machine, manufacture, and/or collection thereof.

dissolve—to cause to pass into a solution.

emit—to give off from a substance.

fabricate—to construct and/or manufacture.

fan—a rotating device capable of propelling a gas.

fill—to add liquid to a cartridge.

fill valve assembly—a system that, upon flushing a toilet, cause water to enter into the toilet tank, the system comprises a float that keeps the water in the toilet tank from exceeding a predetermined maximum level.

hold—to at least partially surround such that motion is restrained.

turbine wheel compartment—a covering that at least partially surrounds something.

install—to connect or set in position and prepare for use.

level—elevation.

may—is allowed and/or permitted to, in at least some embodiments.

method—a process, procedure, and/or collection of related activities for accomplishing something.

partially—to some extent.

plurality—the state of being plural and/or more than one.

predetermined—established in advance.

propel—to impart motion via application of a force.

provide—to furnish, supply, give, and/or make available.

receive—to get, take, acquire, and/or obtain.

release—to cause a discharge or emission of something.

repeatedly—again and again; repetitively.

rotate—to turn about an axis.

sanitizing agent—a substance that reduces a count of living microorganisms on a surface.

set—a related plurality.

substantially—to a great extent or degree.

support—to bear the weight of, especially from below.

system—a collection of mechanisms, devices, machines, articles of manufacture, processes, data, and/or instructions, the collection designed to perform one or more specific functions.

tablet—a molded block of a solid material that releases an aroma when contacted with running water.

toilet—a fixed receptacle into which a person may urinate or defecate, typically comprising a bowl coupled to a system for flushing away waste into a sewer or septic tank.

toilet fill valve assembly—a system coupled to a water supply that refills a toilet tank after the toilet tank is flushed by a user. The toilet fill valve assembly comprises a float switch that allows water to flow into the toilet tank when the water level is below a predetermined threshold and shut the water flow into the toilet tank off when the water level reaches the predetermined threshold.

toilet tank—a reservoir component of a toilet system that holds water, which water is released to flush and refill a toilet bowl comprised by the system.

vapor—a substance in a gaseous state.

via—by way of and/or utilizing.

turbine wheel—a rotating device capable of propelling a fluid.

turbine wheel assembly—a system that comprises a rotating device capable of propelling a fluid.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
   a turbine wheel compartment;
   a turbine wheel assembly, the turbine wheel assembly housed in the turbine wheel compartment, the turbine wheel compartment coupleable to a toilet fill valve assembly such that the turbine wheel assembly is housed within a toilet tank, the turbine wheel assembly comprising a turbine wheel, the turbine wheel constructed to rotate as water fills the toilet tank;
   a magnet;
   a fan coupled to the turbine wheel via the magnet, the fan constructed to rotate with the turbine wheel and propel water or air across a cartridge comprising fragrance oil such that the fragrance oil partially dissolves and is released into the toilet tank; and
   a shroud that substantially surrounds a periphery of the fan.

2. The system of claim 1, further comprising:
   the toilet fill valve assembly.

3. The system of claim 1, further comprising:
   the toilet tank.

4. The system of claim 1, further comprising:
   a toilet comprising the toilet tank.

5. The system of claim 1, further comprising:
   the cartridge.

6. The system of claim 1, wherein:
   the cartridge comprises a deodorant.

7. The system of claim 1, wherein:
   the cartridge comprises a cleaning agent.

8. The system of claim 1, wherein:
   the cartridge comprises a sanitizing agent.

9. A method comprising:
   providing a system, the system comprising:
      a turbine wheel compartment;
      a turbine wheel assembly, the turbine wheel assembly housed in the turbine wheel compartment, the turbine wheel compartment coupleable to a toilet fill valve assembly such that the turbine wheel assembly is housed within a toilet tank, the turbine wheel assembly comprising a turbine wheel, the turbine wheel constructed to rotate as water fills the toilet tank;

a magnet;

a fan coupled to the turbine wheel via the magnet, the fan constructed to rotate with the turbine wheel and propel water or air across a cartridge comprising fragrance oil such that the fragrance oil partially dissolves and is released into the toilet tanked; and a shroud that substantially surrounds a periphery of the fan.

10. The method of claim 9, further comprising:
obtaining the turbine wheel compartment.

11. The method of claim 9, further comprising:
obtaining the cartridge.

12. The method of claim 9, further comprising:
obtaining the turbine wheel.

13. The method of claim 9, further comprising:
causing the cartridge to be coupled to the fan.

14. The method of claim 9, further comprising:
causing the fan to be coupled to the shroud.

15. The method of claim 9, further comprising:
causing the system to be coupled to the toilet tank.

\* \* \* \* \*